(12) United States Patent
Ferrara et al.

(10) Patent No.: US 11,460,555 B2
(45) Date of Patent: Oct. 4, 2022

(54) HEAT DISSIPATION IN AN OPTICAL DEVICE

(71) Applicant: OURS Technology, LLC, Mountain View, CA (US)

(72) Inventors: James Ferrara, Santa Clara, CA (US); Sen Lin, Santa Clara, CA (US)

(73) Assignee: OURS Technology, LLC, Mountain View, CA (US)

( * ) Notice: Subject to any disclaimer, the term of this patent is extended or adjusted under 35 U.S.C. 154(b) by 0 days.

(21) Appl. No.: 17/542,459

(22) Filed: Dec. 5, 2021

(65) Prior Publication Data

US 2022/0179055 A1 Jun. 9, 2022

Related U.S. Application Data

(60) Provisional application No. 63/122,146, filed on Dec. 7, 2020.

(51) Int. Cl.
*G01S 7/481* (2006.01)
*G01S 17/931* (2020.01)
(Continued)

(52) U.S. Cl.
CPC ........... *G01S 7/4818* (2013.01); *G01S 7/4911* (2013.01); *G01S 17/931* (2020.01);
(Continued)

(58) Field of Classification Search
None
See application file for complete search history.

(56) References Cited

U.S. PATENT DOCUMENTS 6,408,111 B1 * 6/2002 Doerr ............... G02F 1/0147
385/132
6,847,750 B1 * 1/2005 Baumann ............ G02F 1/011
385/16

(Continued)

FOREIGN PATENT DOCUMENTS

WO 2015157963 A1 10/2015
WO 2019215501 A2 11/2019

OTHER PUBLICATIONS

International Searching Authority, Patent Cooperation Treaty, International Application No. PCT/US2021/062236, Notification Date: Mar. 31, 2022, 5 pages.

(Continued)

*Primary Examiner* — Eric L Bolda
(74) *Attorney, Agent, or Firm* — Freestone Intellectual Property Law PLLC; Aaron J. Visbeek; William J. Pigott

(57) ABSTRACT

A thermal-optical phase shifter includes a substrate layer, a cladding layer, and a beam in the cladding layer. The thermal-optical phase shifter includes a waveguide and a heating element disposed in the beam. The thermal-optical phase shifter includes a thermally conductive structure disposed on the cladding layer to disperse heat from the beam. The thermally conductive structure may include a metal strip disposed longitudinally along the beam, may include thermally conductive pads, and/or may include thermally conductive vias coupled between the cladding layer and the substrate layer. The thermal-optical phase shifter may be incorporated into light detection and ranging (LIDAR) devices, telecommunications devices, and/or computing devices.

19 Claims, 11 Drawing Sheets

(51) Int. Cl.
   *G02B 6/42*     (2006.01)
   *G01S 7/4911*   (2020.01)
   *G02F 1/01*     (2006.01)

(52) U.S. Cl.
   CPC ......... *G02B 6/4269* (2013.01); *G02B 6/4272* (2013.01); *G02B 6/4273* (2013.01); *G02F 1/0147* (2013.01)

(56) References Cited

U.S. PATENT DOCUMENTS

| | | | |
|---|---|---|---|
| 10,209,539 B1* | 2/2019 | Doerr | G02F 1/011 |
| 2004/0062481 A1* | 4/2004 | Dieckroger | G02F 1/011 |
| | | | 385/28 |
| 2005/0169566 A1 | 8/2005 | Takahashi | |
| 2008/0181550 A1 | 7/2008 | Earnshaw | |
| 2009/0297092 A1 | 12/2009 | Takahashi | |
| 2015/0253510 A1* | 9/2015 | Celo | G02F 1/225 |
| | | | 385/16 |
| 2016/0334648 A1* | 11/2016 | Lu | G02F 1/2257 |
| 2018/0284286 A1* | 10/2018 | Eichenholz | G01S 17/89 |
| 2020/0036153 A1* | 1/2020 | Strohkendl | G02B 6/02338 |
| 2021/0109382 A1* | 4/2021 | Bovington | G02B 6/136 |

OTHER PUBLICATIONS

International Searching Authority, Patent Cooperation Treaty, Written Opinion of the International Searching Authority, International Application No. PCT/US2021/062236, dated Mar. 31, 2022, 7 pages.

\* cited by examiner

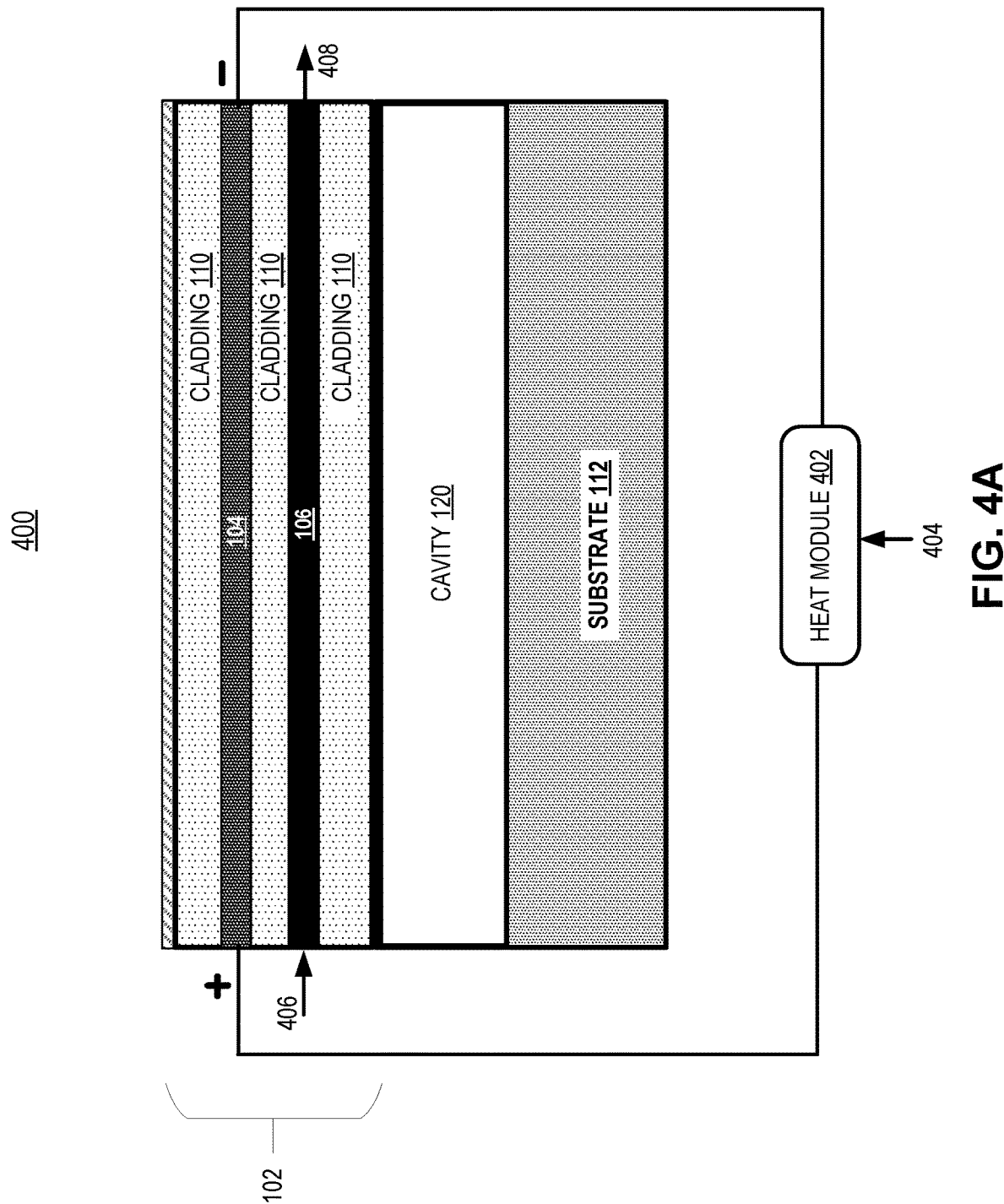

HEAT DISSIPATION IN AN OPTICAL DEVICE

CROSS-REFERENCE TO RELATED APPLICATIONS

This application claims priority to U.S. provisional Application No. 63/122,146 filed Dec. 7, 2020, which is hereby incorporated by reference.

TECHNICAL FIELD

This disclosure relates generally to optics and in particular to light detection and ranging (LIDAR).

BACKGROUND INFORMATION

Frequency Modulated Continuous Wave (FMCW) LIDAR directly measures range and velocity of an object by directing a frequency modulated, collimated light beam at a target. Both range and velocity information of the target can be derived from FMCW LIDAR signals. Designs and techniques to increase the accuracy of LIDAR signals are desirable.

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment. Autonomous vehicles may include one or more LIDAR devices for sensing its environment.

BRIEF SUMMARY OF THE INVENTION

Implementations of the disclosure includes a thermal-optical phase shifter that includes a beam, a waveguide, a heating element, and a thermally conductive strip. The beam is formed in a cladding layer and suspended over a cavity. The waveguide is at least partially disposed in the beam. The heating element is at least partially disposed in the beam. The thermally conductive strip is disposed on the beam, and the thermally conductive strip is arranged to disperse heat from the beam.

In an implementation, the thermal-optical phase shifter includes a plurality of lateral arms configured to suspend the beam over the cavity. Each of the plurality of lateral arms is coupled between the beam and a remaining portion of the cladding layer.

In an implementation, at least two of the plurality of lateral arms on a first side of the beam are isolated by first openings in the cladding layer. At least two of the plurality of lateral arms on a second side of the beam are isolated by second openings in the cladding layer. Each of the plurality of lateral arms are formed in the cladding layer.

In an implementation, the thermal-optical phase shifter includes a plurality of thermally conductive pads disposed on the cladding layer. The thermal-optical phase shifter also includes a plurality of thermally conductive fingers respectively coupled between the thermally conductive strip and the plurality of thermally conductive pads. At least one of the plurality of thermally conductive fingers extends in a particular direction from the thermally conductive strip over a corresponding one of the plurality of lateral arms.

In an implementation, the thermal-optical phase shifter includes a substrate layer and a plurality of thermally conductive vias. The cladding layer is disposed on the substrate layer. The plurality of thermally conductive vias are disposed in the cladding layer and are configured to thermally couple the substrate layer to at least one of the plurality of thermally conductive pads.

In an implementation, the thermally conductive strip includes metal.

In an implementation, the thermal-optical phase shifter includes a substrate layer. The cladding layer is disposed on the substrate layer, and the cavity is formed in the substrate layer and is arranged to thermally isolate the beam from the substrate layer with air.

In an implementation, the heating element is disposed between the waveguide and the thermally conductive strip. The waveguide is disposed in a particular direction with reference to the beam.

In an implementation, the heating element is disposed in the cladding layer and is positioned in the particular direction with reference to the beam and is arranged to impart heat to the waveguide.

In an implementation, the waveguide includes silicon or silicon nitride. The cladding layer is formed from silicon dioxide. The heating element is a resistive heating element and is formed from titanium nitride.

In an implementation, a portion of the cladding layer is disposed between the waveguide and the heating element.

In an implementation, the thermal-optical phase shifter includes a substrate layer that is a silicon substrate.

Implementations of the disclosure includes a light detection and ranging (LIDAR) device that includes a thermal-optical phase shifter and a heat sink. The thermal-optical phase shifter includes a beam, a waveguide, a heating element, and a thermally conductive structure. The beam is formed in a cladding layer and suspended over a cavity. The waveguide is at least partially disposed in the beam. The heating element is at least partially disposed in the beam. The thermally conductive structure is disposed on the beam. The thermally conductive structure is arranged to disperse heat from the beam. The heat sink is coupled to the thermal-optical phase shifter and is configured to disperse heat from the thermally conductive structure.

In an implementation, the thermal-optical phase shifter further includes a silicon substrate layer and a cavity. The cavity is formed in the silicon substrate to thermally isolate the beam from the silicon substrate layer.

In an implementation, the thermally conductive structure includes a thermally conductive strip disposed in a particular direction on the beam. The thermally conductive structure includes a plurality of thermally conductive pads coupled to the thermally conductive strip. The heat sink is coupled to at least one of the thermally conductive pads.

In an implementation, the heat sink includes at least one of solder balls, silver paste, a ceramic heat spreader, or an active cooler.

In an implementation, the thermally conductive structure includes metal.

In an implementation, the thermal-optical phase shifter further includes a plurality of lateral arms configured to suspend the beam over the cavity. Each of the plurality of lateral arms is coupled between the beam and the cladding layer.

Implementations of the disclosure includes an autonomous vehicle that includes a light detection and ranging (LIDAR) sensor and a control system. The LIDAR sensor includes a thermal-optical phase shifter and a heat sink. The thermal-optical phase shifter includes a beam, a waveguide, a heating element, and a thermally conductive structure. The beam is formed in a cladding layer and suspended over a cavity. The waveguide is at least partially disposed in the beam. The heating element is at least partially disposed in the beam. The thermally conductive structure is disposed on the beam. The thermally conductive structure is arranged to disperse heat from the beam. The heat sink is coupled to the thermal-optical phase shifter and configured to disperse heat from the thermally conductive structure. The control system is configured to control the autonomous vehicle in response to a returning beam that is a reflection of a LIDAR transmit beam.

In an implementation, the autonomous vehicle includes a heat module configured to modulate a phase of the LIDAR transmit beam propagating through the waveguide by modulating electrical current driven through the heating element.

In an implementation, the thermal-optical phase shifter includes a thermally conductive pad disposed on the cladding layer, wherein the thermally conductive pad is coupled to the thermally conductive strip, wherein the thermally conductive pad is coupled to a heat sink through at least one via.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 4A illustrates a heat module applied to a suspended thermal-optical phase shifter, in accordance with implementations of the disclosure.

DETAILED DESCRIPTION

Figure 1A:
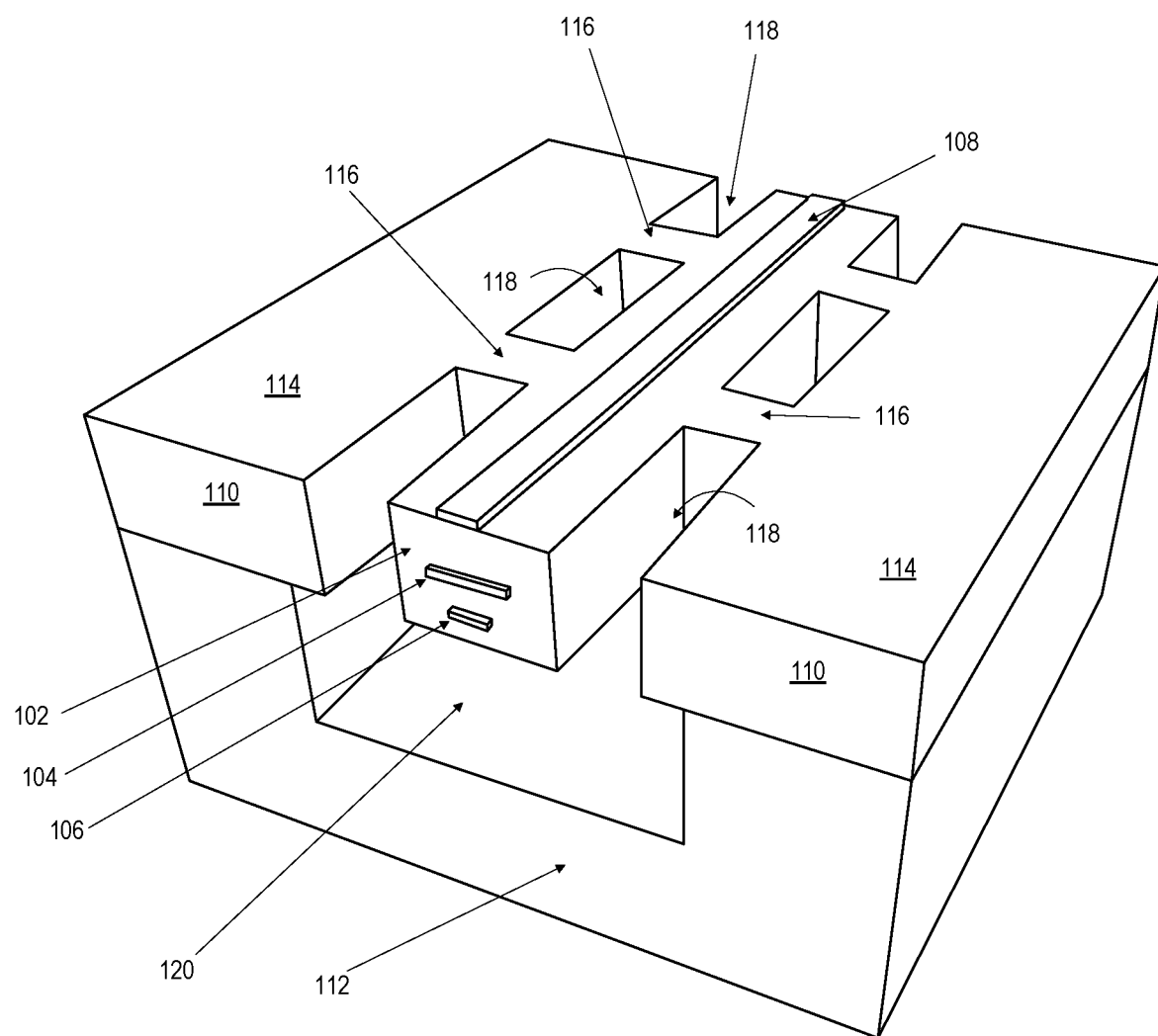
FIGS. 1A-1C illustrate a suspended thermal-optical phase shifter, in accordance with implementations of the disclosure.

Implementations of heat dissipation designs in optical devices (e.g., thermal-optical phase shifters) are described herein. In the following description, numerous specific details are set forth to provide a thorough understanding of the implementations. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

Temperature at optical waveguides may need to be manipulated to achieve desired functionalities, such as optical phase control. In an example context, the phase of light propagating through a waveguide may be changed due to the temperature of the waveguide. Thus, thermal behaviors such as thermal tuning efficiency and thermal bandwidth are important for certain applications and often require careful design and optimization.

Implementations of the disclosure include a thermally conductive structure arranged to disperse and dissipate heat from a suspended thermal-optical phase shifter control the phase properties of light propagating through the waveguide. The thermally conductive structure may include a thermally conductive strip, thermally conductive pads, thermally conductive lateral arms, and/or thermally conductive vias. The thermally conductive structure may be metallic. The thermal-optical phase shifter includes a waveguide and a heating element that run through a beam formed in a cladding layer. The beam is suspended over an air-filled cavity to thermally isolate the beam and to assist in controlling the temperature of the waveguide. Varying the heat dissipation capability around the waveguide affects the thermal behavior of the waveguide.

Implementations of the disclosure may include a light detection and ranging (LIDAR) device that includes thermal-optical phase shifters having waveguides that are selectively heated and cooled to modulate a phase of (infrared) light that is emitted by the LIDAR device. The LIDAR device may be included in an autonomous vehicle or a system for an autonomous vehicle.

FIG. 1A illustrates a perspective view of a thermal-optical phase shifter 100 having a thermally conductive structure arranged to dissipate heat, in accordance with implementations of the disclosure. Thermal-optical phase shifter 100 may be used in a variety of technologies such as interferometers, resonators, modulators, LIDAR, telecommunications, and computing. Thermal-optical phase shifter 100 is configured to thermally manipulate properties of an optical waveguide to tune, for example, thermal efficiency and thermal bandwidth of the optical waveguide. Thermal-optical phase shifter 100 includes a beam 102, a heating element 104, a waveguide 106, and a thermally conductive structure 108, according to an implementation.

Beam 102 is suspended and is partially thermally isolated from surrounding structures, according to an implementation. Thermal isolation of beam 102 enables beam 102 to provide a relatively stable thermal environment to support operation of waveguide 102, according to one implementation. Beam 102 is formed from a cladding layer 110 that is disposed on, deposited on, or bonded to a substrate layer 112, according to an implementation. Cladding layer 110 may be formed from, for example, silicon dioxide, which may have a thermal conductivity of $$1.4 \left[ \frac{W}{m*K} \right] \text{(watts per meter per Kelvin)},$$

according to one implementation. Substrate layer 112 may be silicon and may have a thermal conductivity of $$130 \left[ \frac{W}{m*K} \right].$$

Beam 102 is suspended from non-beam portions 114 of cladding layer 110 with a number of lateral arms 116, according to an implementation. Lateral arms 116 are arranged transversely to the longitudinal axis of beam 102, according to an implementation. Lateral arms 116 are configured to support beam 102 and couple beam 102 to non-beam portions 114 of cladding layer 110, according to an implementation. Beam 102 is thermally isolated from non-beam portions 114 of cladding layer 110 with a number of openings 118 that separate lateral arms 116 from each other, on each side of beam 102, according to an implementation. Openings 118 extend through cladding layer 110 and are coupled to a cavity 120, according to an implementation. Cavity 120 is formed within substrate layer 112, is an air-filled void, and is configured to thermally isolate beam 102 from substrate layer 112, according to an implementation.

Waveguide 106 is configured to transmit signals longitudinally through beam 102, according to an implementation. Waveguide 106 is an optical waveguide formed from silicon, which may have a thermal-optic coefficient of $$18 \times 10^{-5} \left[ \frac{1}{K} \right] \text{(per Kelvin)},$$

according to an implementation. Waveguide 106 is an optical waveguide formed from silicon nitride, which may have a thermal-optic coefficient of $$2.45 \times 10^{-5} \left[ \frac{1}{K} \right],$$

according to an implementation. Waveguide 106 is disposed or embedded within beam 102 within cladding layer 110 and in-between heating element 104 and cavity 120, according to one implementation. Waveguide 106 has a higher refractive index than cladding layer 110.

Heating element 104 is configured to thermally affect waveguide 106, according to an implementation. Heating element 104 is disposed longitudinally within beam 102 between waveguide 106 and thermally conductive structure 108 and is configured to manipulate the temperature of waveguide 106, to adjust thermal properties waveguide 106, according to an implementation. Adjusting the temperature of waveguide 106 adjusts the thermal efficiency and bandwidth of thermal-optical phase shifter 100, according to an implementation. Heating element 104 includes or is formed from titanium nitride, which may have an electrical conductivity of $$2.3 \times 10^6 \left[ \frac{S}{m} \right] \text{(Siemens per meter)},$$

according to an implementation. Other resistive materials may also be used to construct heating element 104 to manipulate the temperature of waveguide 106, according to an implementation. In one implementation, heating element 104 is positioned between waveguide 106 and thermally conductive structure 108. In one implementation, waveguide 106 is positioned between heating element 104 and thermally conductive structure 108.

Thermally conductive structure 108 is arranged to disperse heat from beam 102, according to an implementation. Thermally conductive structure 108 is disposed longitudinally upon beam 102 and is positioned distal to cavity 120. Thermally conductive structure 108 is formed as a strip of thermally conductive material, according to an implementation. Thermally conductive structure 108 is formed similarly to a conductive trace, according to an implementation. Thermally conductive structure 108 is a metal strip deposited on beam 102 and is configured to dissipate heat upwards from beam 102, according to an implementation. Thermally conductive structure 108 is constructed from gold, copper, tungsten, or another metal or thermally conductive material, according to various implementations.

Figure 1B:
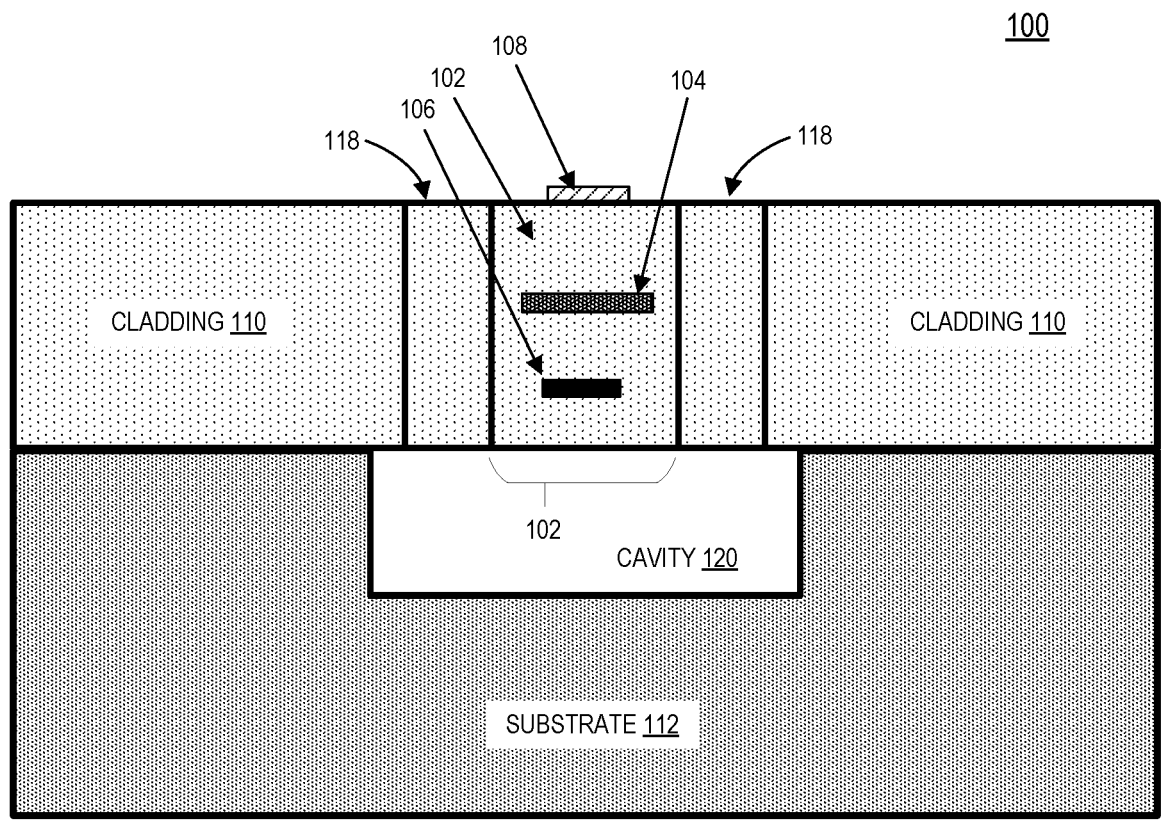

FIG. 1B illustrates a front view of thermal-optical phase shifter 100, according to implementations of the disclosure. As illustrated, cavity 120 may be formed in substrate layer 112 and have a width that is wider than beam 102, according to an implementation. The width of cavity 120 is wider than the (transverse) width of beam 102 combined with the width of openings 118, to thermally isolate beam 102 from substrate layer 112, according to an implementation.

Figure 1C:
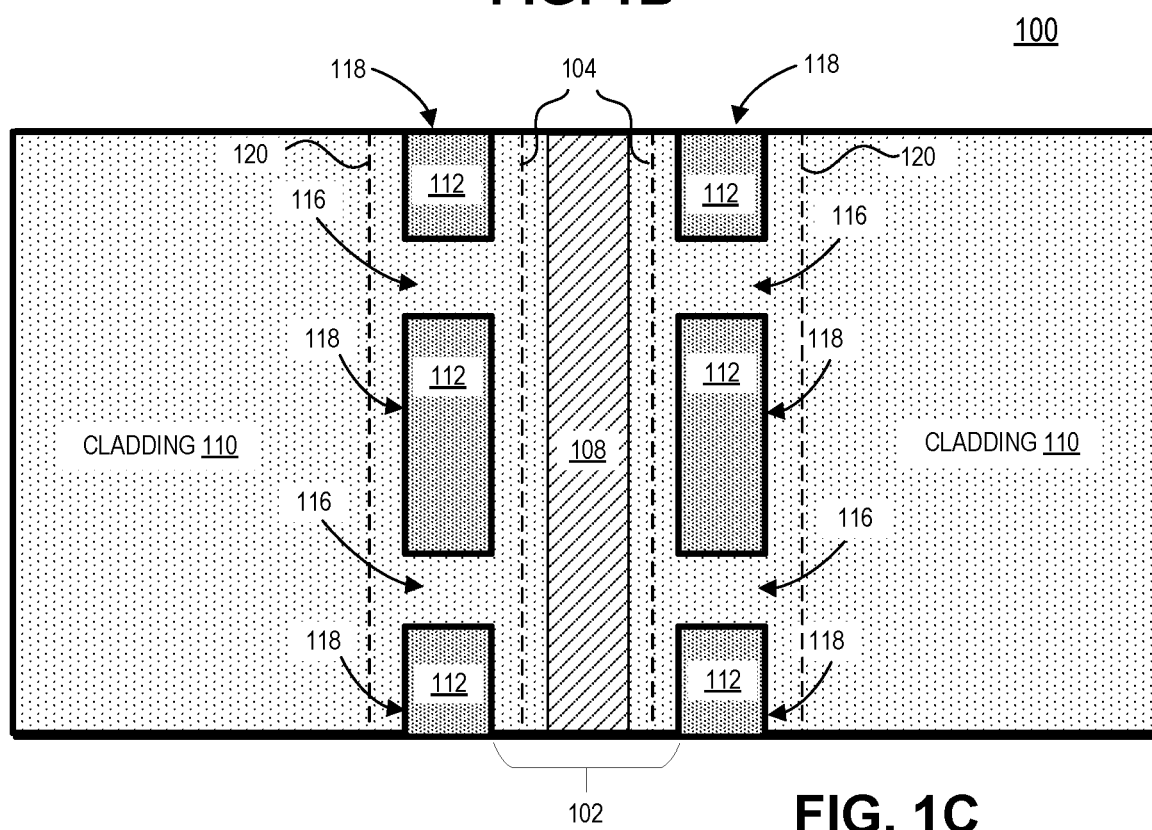

FIG. 1C illustrates a top view of thermal-optical phase shifter 100, according to an implementation. As illustrated, cavity 120 may have a length that is as long as or longer than a longitudinal length of beam 102, to provide thermal isolation with air for the length of beam 102, according to an implementation.

Figure 2A:
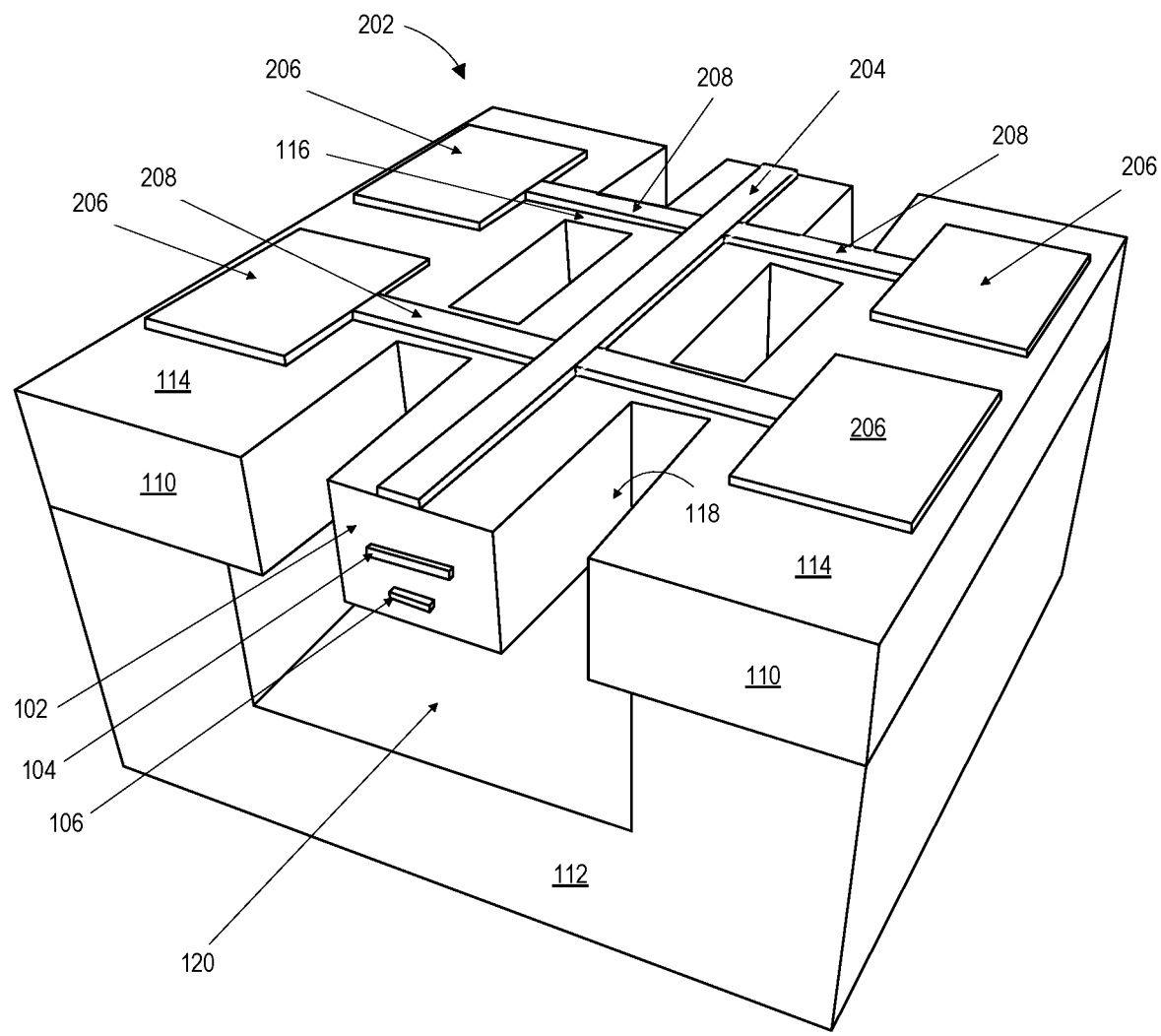
FIGS. 2A-2C illustrate a suspended thermal-optical phase shifter, in accordance with implementations of the disclosure.
Figure 2B:
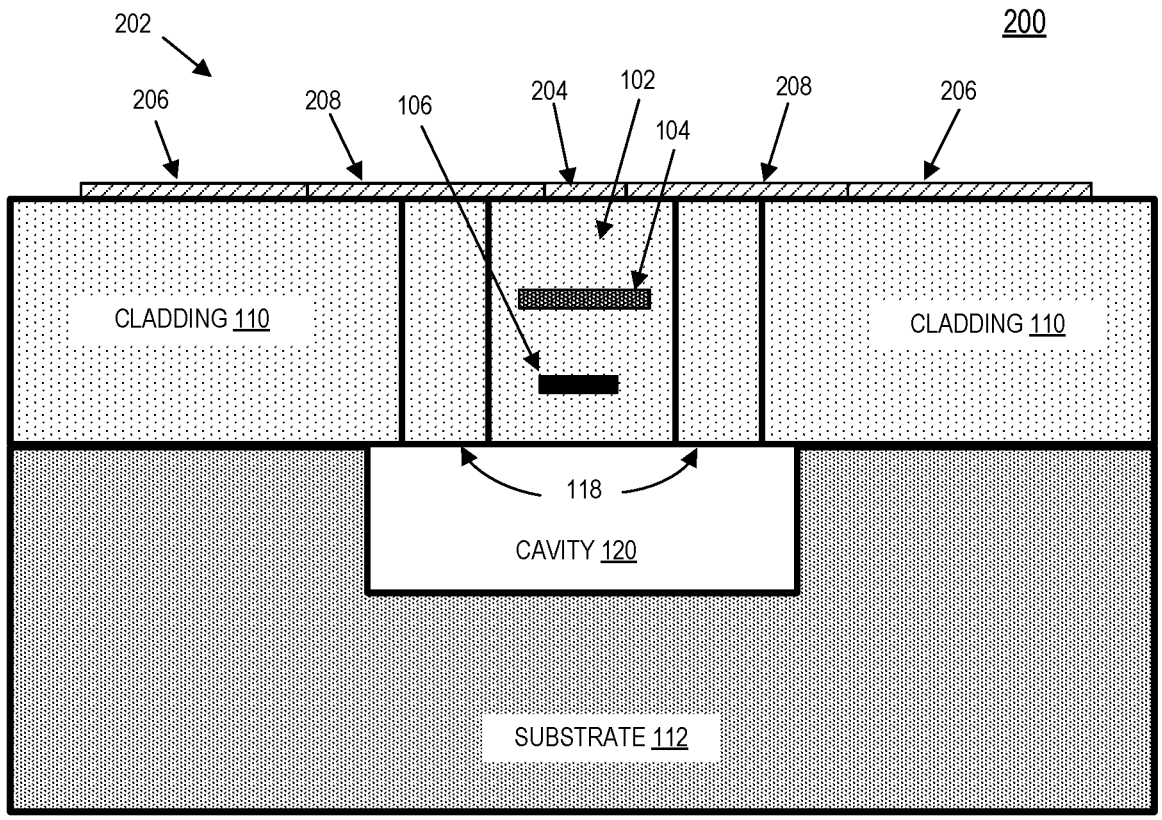
Figure 2C:
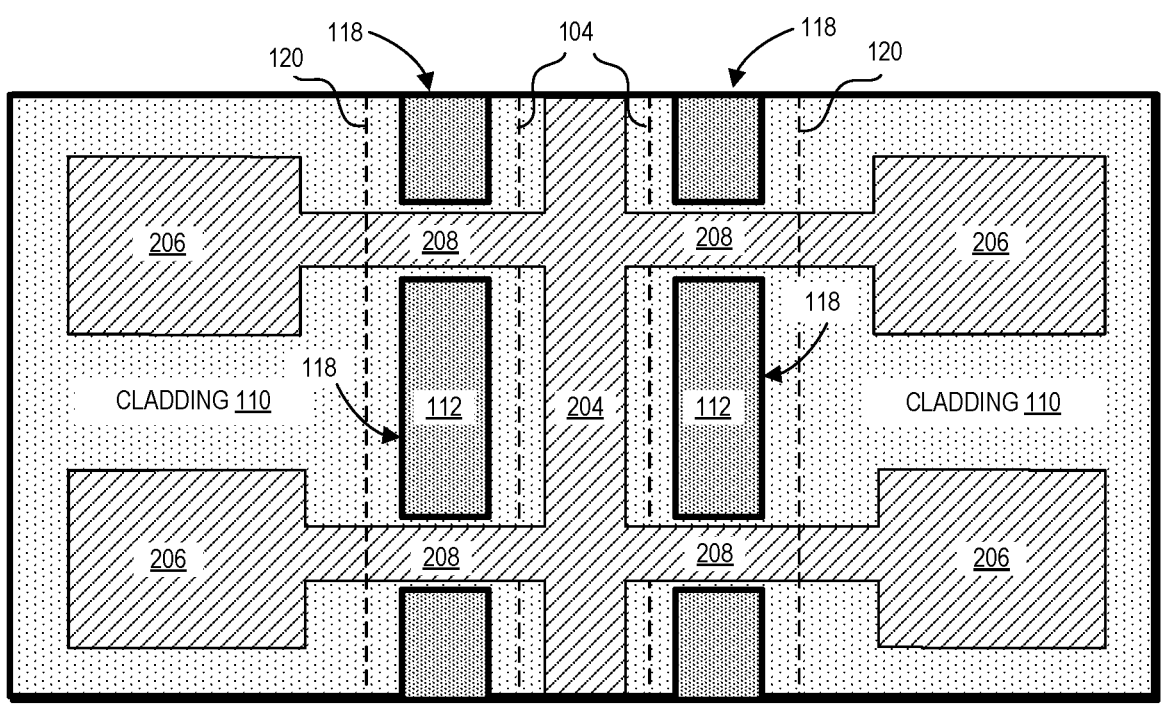

FIGS. 2A-2C illustrates various views of a thermal-optical phase shifter 200 having a thermally conductive structure 202, in accordance with implementations of the disclosure. Thermally conductive structure 202 may include a thermally conductive strip 204, a number of thermally conductive pads 206, and a number of thermally conductive fingers 208, according to one implementation.

Thermally conductive structure 202 is disposed upon cladding layer 110, according to one implementation. Thermally conductive structure 202 is formed from copper, gold, tungsten, another metal, or some other thermally conductive material, according to various implementations. Thermally conductive structure 202 is configured to disperse heat from beam 102, according to an implementation.

Thermally conductive strip 204 is thermally conductive structure 108 (shown in FIG. 1), according to an implementation.

Thermally conductive pads 206 are rectangular structures disposed on non-beam portions 114 of cladding layer 110, according to an implementation. Thermally conductive pads 206 are disposed on cladding layer 110 proximate to lateral arms 116, according to one implementation. Thermally conductive pads 206 are disposed proximate to each one of lateral arms 116, according to one implementation. Thermally conductive pads may provide additional surface area for heat dissipation and surface area for additional thermal connections or couplings (e.g., solder balls, vias, etc.).

Thermally conductive fingers 208 are disposed on cladding layer 110 between thermally conductive strip 204 and thermally conductive pads 206, according to one implementation. Thermally conductive fingers 208 extend laterally from thermally conductive strip 204 towards thermally conductive pads 206, according to one implementation. Thermally conductive fingers 208 are disposed on and are carried by lateral arms 116, according to an implementation. Thermally conductive fingers 208 are configured to transfer heat from thermally conductive strip 204 to thermally conductive pads 206 to support dissipation of heat from beam 102, according to one of implementation.

Figure 3A:
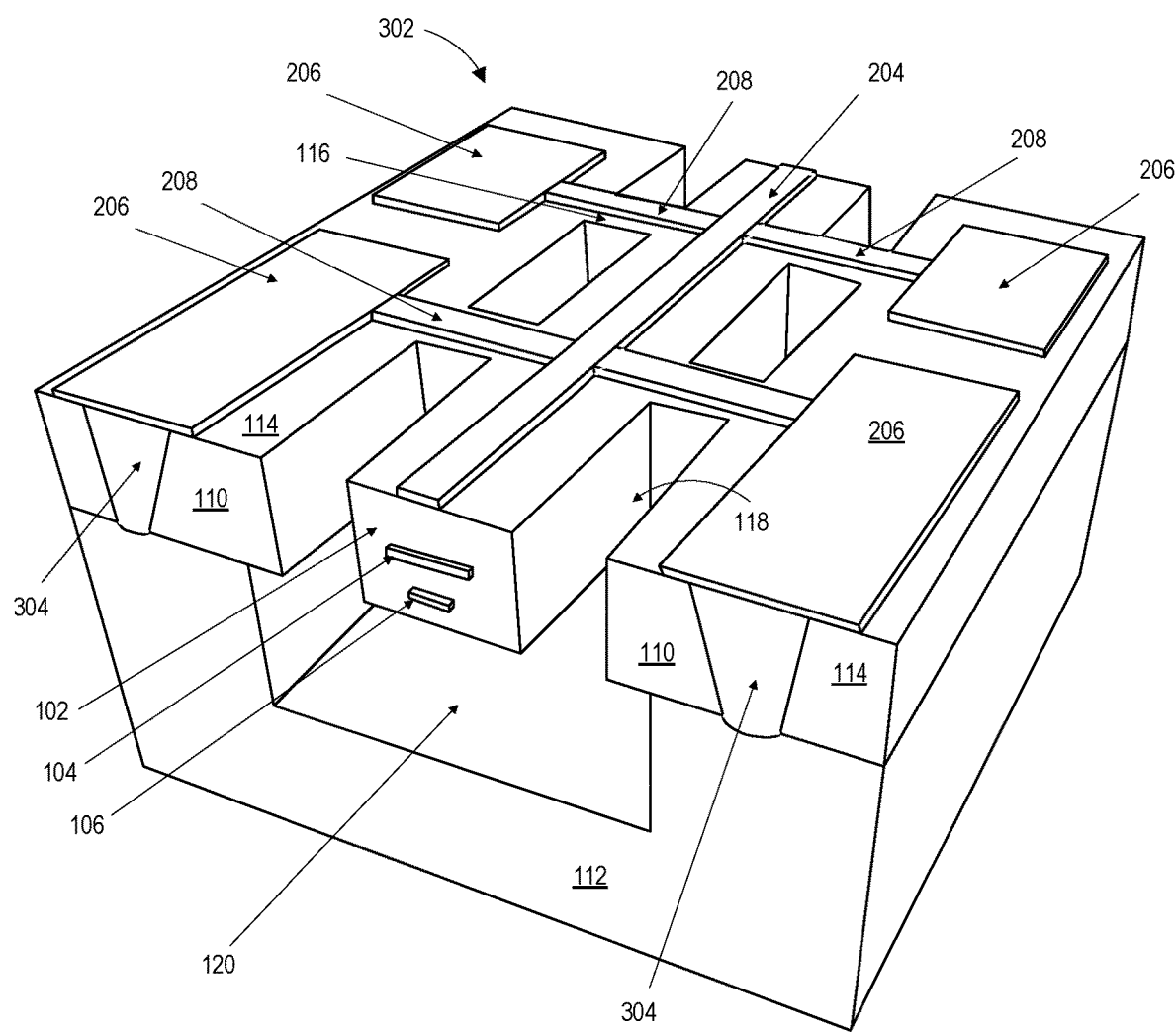
FIGS. 3A-3C illustrate a suspended thermal-optical phase shifter, in accordance with implementations of the disclosure.
Figure 3B:
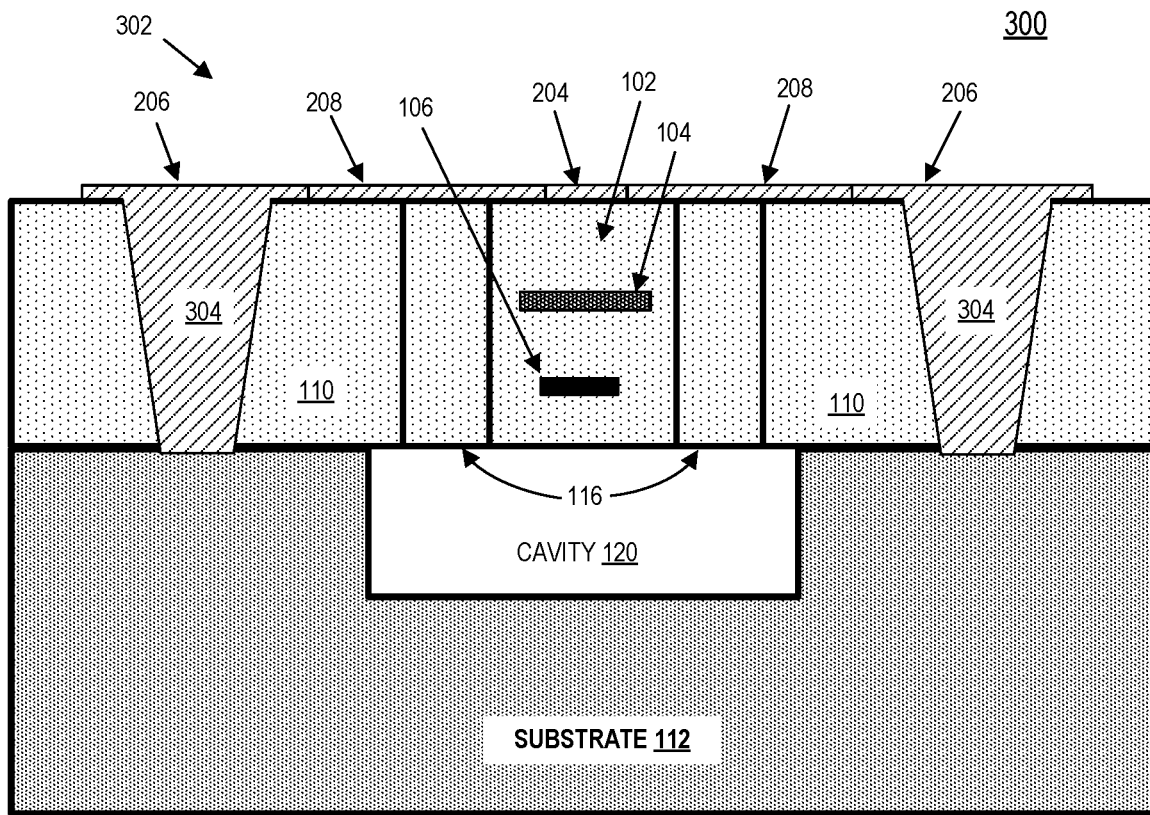
Figure 3C:
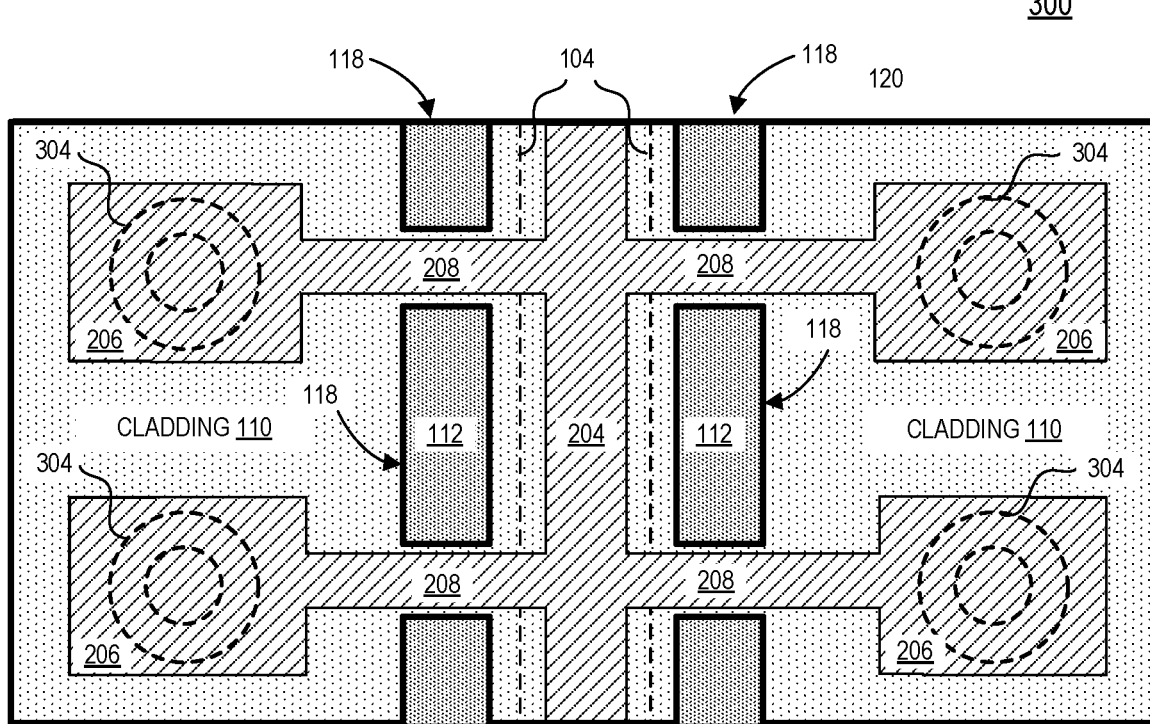

FIGS. 3A-3C illustrate a thermal-optical phase shifter 300, according to implementations of the disclosure. Thermal-optical phase shifter 300 includes a thermally conductive structure 302 that includes thermally conductive strip 204, thermally conductive pads 206, thermally conductive fingers 208, and thermally conductive vias 304, according to an implementation. Thermally conductive vias 304 are disposed within cladding layer 110, according to one implementation. Thermally conductive vias 304 extend to substrate layer 112 from thermally conductive pads 206, according to an implementation. Thermally conductive vias 304 couple thermally conductive pads 206 to substrate layer 112, to disperse heat from beam 102, according to one implementation. Thermally conductive vias 304 may be formed using a first metal that is different from a second metal used to form the remaining portions of thermally conductive structure 302. For example, thermally conductive vias 304 may be formed from tungsten, and thermally conductive pads 206 may be formed from copper or gold, according to one implementation. Thermally conductive structure 302 is configured to dissipate heat from beam 102 while beam 102 is thermally isolated from substrate layer 112 with cavity 120 and while beam 102 is thermally isolated from non-beam portions 114 of cladding layer 110 with openings 118, according to implementations of the disclosure.

Figure 4B:
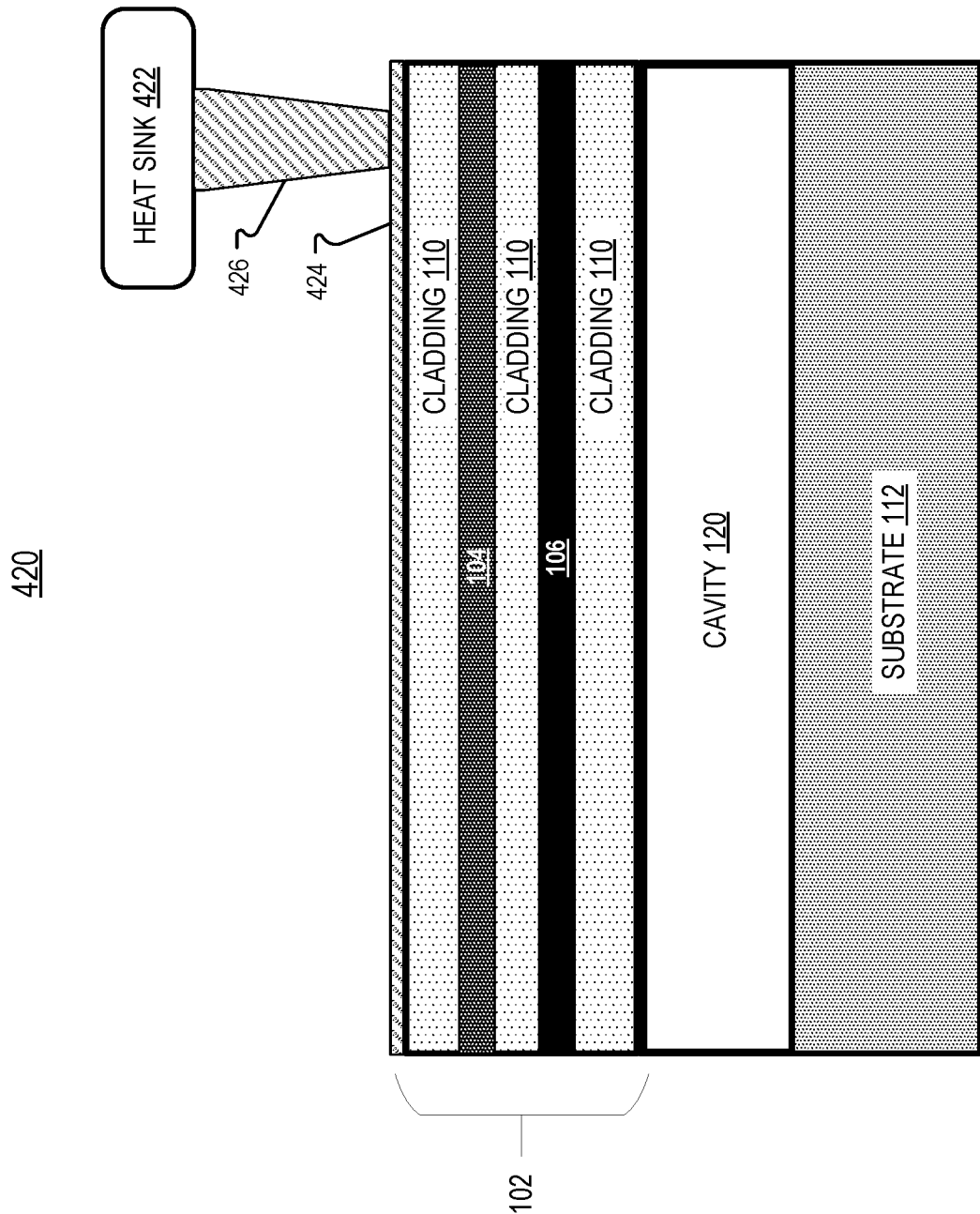
FIG. 4B illustrates a heat sink applied to a suspended thermal-optical phase shifter, in accordance with implementations of the disclosure.

FIGS. 4A and 4B illustrate additional example components that may be used to adjust thermal properties of a thermal-optical phase shifter.

FIG. 4A illustrates a cross-sectional side view of a thermal-optical phase shifter 400, according to implementations of the disclosure. Thermal-optical phase shifter 400 may be an implementation of thermal-optical phase shifter 100, 200, and/or 300. Thermal-optical phase shifter 400 includes a heat module 402 configured to drive heating element 104, according to an implementation. Heat module 402 selectively drives electrical current through heating element 104 in response to thermal signal 404, according to an implementation. Thermal signal 404 may be an analog or digital control signal. Heat module 402 may include one or more transistors. Heat module 402 is coupled to opposite ends of heating element 104 to drive an electrical current through heating element 104 in order to impart heat to waveguide 106. Thus, heat module 402 may be coupled to a first portion of heating element 104 and a second portion of heating element 104 that is opposite the first portion of heating element 104. A voltage potential may exist across heating element 104. Heating or cooling waveguide 106 may change the phase of light propagating through waveguide 106. Input light 406 is received by waveguide 106 at an input end of waveguide 106. Input light 406 propagates through waveguide 106 and exits the output end as output light 408. The phase of output light 408 may change depending on the heat imparted to waveguide 106 by heating element 104. Thus, heat module 402 may be configured to modulate a phase of light propagating through waveguide 106 by modulating the electrical current driven through heating element 104. Input light 406 may be infrared light. Input light 406 may be near-infrared light.

FIG. 4B illustrates a cross-sectional side view of a thermal-optical phase shifter 420, in accordance with implementations of the disclosure. Thermal-optical phase shifter 420 may be an implementation of thermal-optical phase shifter 100, 200, and/or 300. Thermal-optical phase shifter 420 includes a heat sink 422 coupled to a thermally conductive structure 424 with one or more thermal connectors 426, according to an implementation. Heat sink 422 may be implemented with solder balls, silver paste, ceramic heat spreaders, and/or one or more active coolers, according to various implementations. Thermal connectors 426 may include one or more metallic layers, one or more thermally conductive vias, or a combination of metallic layers and thermally conductive vias to thermally couple thermally conductive structure 424 to heat sink 422.

Figure 5A:
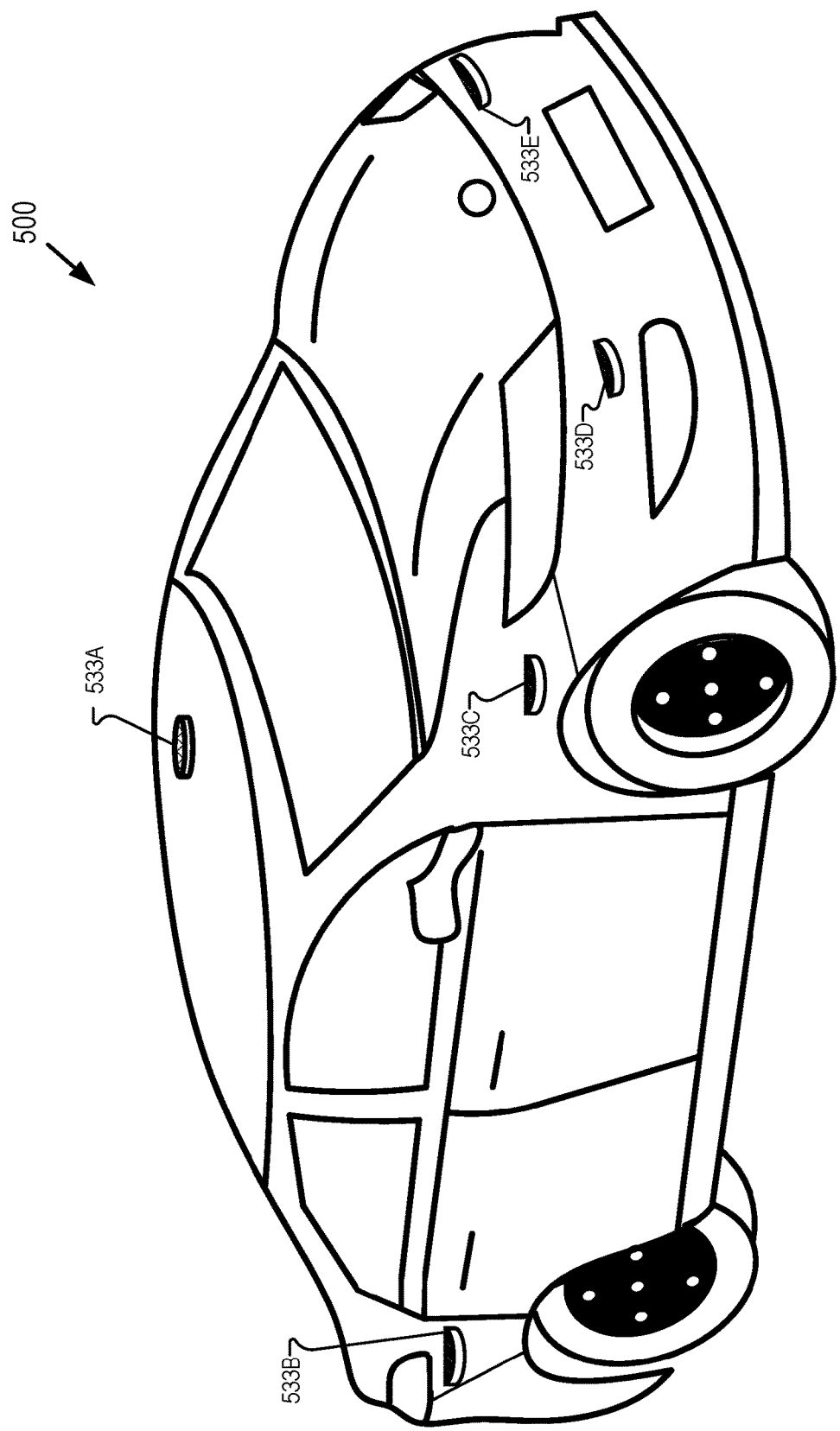
FIG. 5A illustrates an autonomous vehicle including an array of example sensors, in accordance with implementations of the disclosure.
Figure 5B:
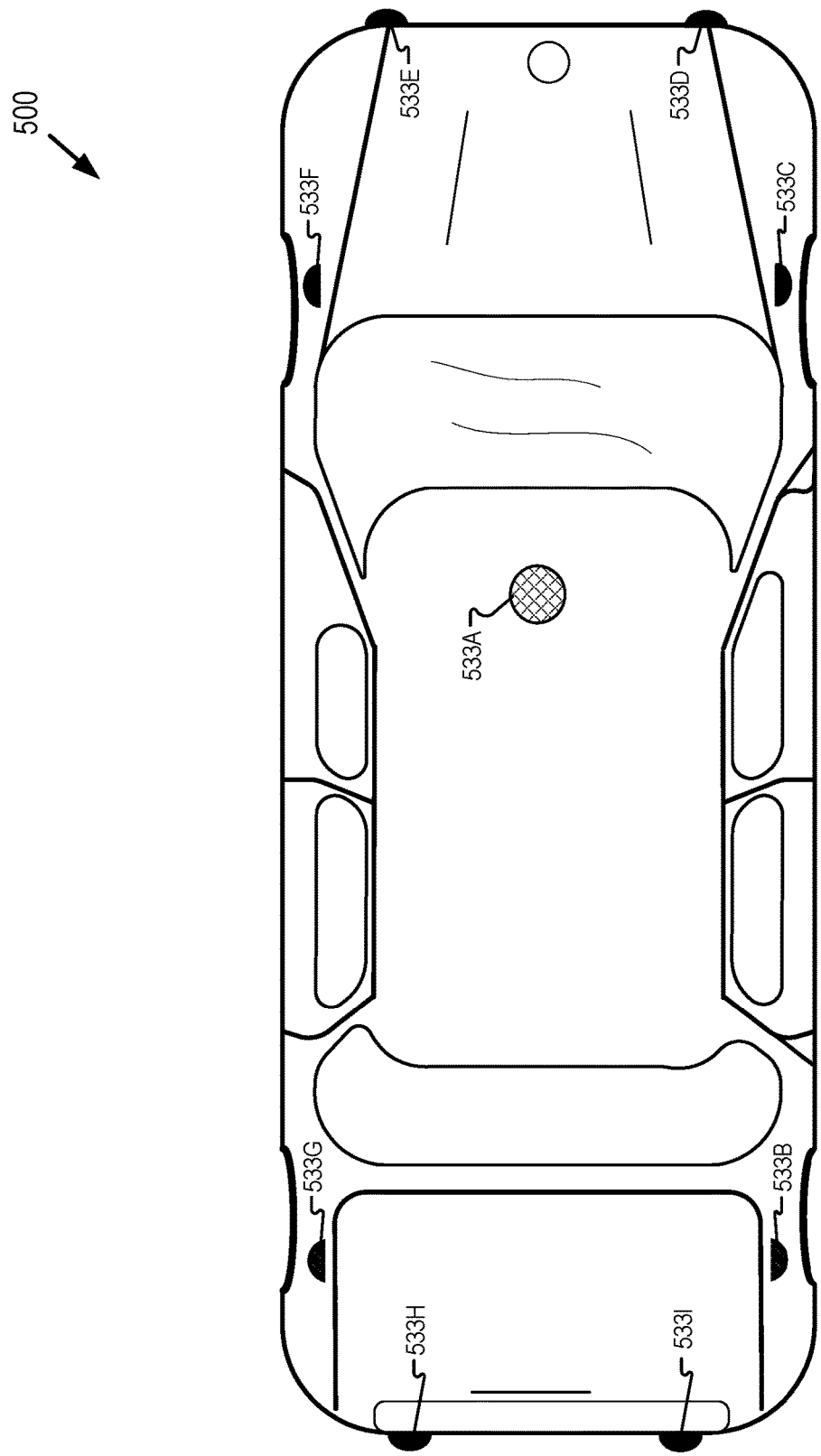
FIG. 5B illustrates a top view of an autonomous vehicle including an array of example sensors, in accordance with implementations of the disclosure.
Figure 5C:
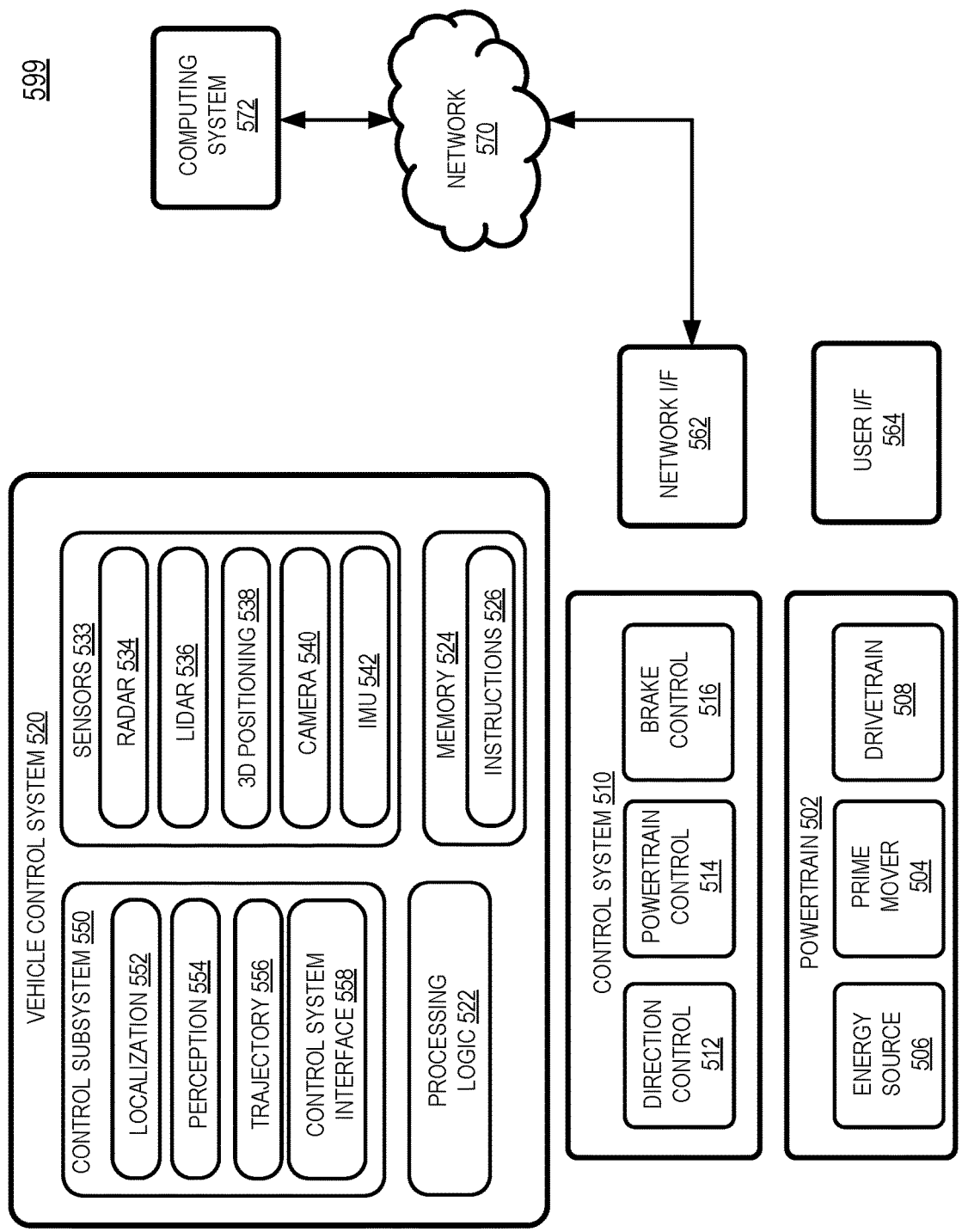
FIG. 5C illustrates an example vehicle control system including sensors, a drivetrain, and a control system, in accordance with implementations of the disclosure.

FIG. 5A illustrates an example autonomous vehicle 500 that may include the thermal-optical phase shifter of FIGS. 1A-4B in a LIDAR device, in accordance with aspects of the disclosure. The illustrated autonomous vehicle 500 includes an array of sensors configured to capture one or more objects of an external environment of the autonomous vehicle and to generate sensor data related to the captured one or more objects for purposes of controlling the operation of autonomous vehicle 500. FIG. 5A shows sensor 533A, 533B, 533C, 533D, and 533E. FIG. 5B illustrates a top view of autonomous vehicle 500 including sensors 533F, 533G, 533H, and 533I in addition to sensors 533A, 533B, 533C, 533D, and 533E. Any of sensors 533A, 533B, 533C, 533D, 533E, 533F, 533G, 533H, and/or 533I may include LIDAR devices that include the thermal-optical phase shifter designs of FIGS. 1A-4B. FIG. 5C illustrates a block diagram of an example system 599 for autonomous vehicle 500. For example, autonomous vehicle 500 may include powertrain 502 including prime mover 504 powered by energy source 506 and capable of providing power to drivetrain 508. Autonomous vehicle 500 may further include control system 510 that includes direction control 512, powertrain control 514, and brake control 516. Autonomous vehicle 500 may be implemented as any number of different vehicles, including vehicles capable of transporting people and/or cargo and capable of traveling in a variety of different environments. It will be appreciated that the aforementioned components 502-516 can vary widely based upon the type of vehicle within which these components are utilized.

The implementations discussed hereinafter, for example, will focus on a wheeled land vehicle such as a car, van, truck, or bus. In such implementations, prime mover 504 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 508 may include wheels and/or tires along with a transmission and/or any other mechanical drive components suitable for converting the output of prime mover 504 into vehicular motion, as well as one or more brakes configured to controllably stop or slow the autonomous vehicle 500 and direction or steering components suitable for controlling the trajectory of the autonomous vehicle 500 (e.g., a rack and pinion steering linkage enabling one or more wheels of autonomous vehicle 500 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 512 may include one or more actuators and/or sensors for controlling and receiving feedback from the direction or steering components to enable the autonomous vehicle 500 to follow a desired trajectory. Powertrain control 514 may be configured to control the output of powertrain 502, e.g., to control the output power of prime mover 504, to control a gear of a transmission in drivetrain 508, thereby controlling a speed and/or direction of the autonomous vehicle 500. Brake control 516 may be configured to control one or more brakes that slow or stop autonomous vehicle 500, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls, and brake controls, as will be appreciated by those of ordinary skill having the benefit of the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 500 is implemented in vehicle control system 520, which may include one or more processors in processing logic 522 and one or more memories 524, with processing logic 522 configured to execute program code (e.g., instructions 526) stored in memory 524. Processing logic 522 may include graphics processing unit(s) (GPUs) and/or central processing unit(s) (CPUs), for example. Vehicle control system 520 may be configured to control powertrain 502 of autonomous vehicle 500 in response to the infrared returning beams that are a reflection of an infrared transmit beam that propagated through waveguide(s) 104 into an external environment of autonomous vehicle 500 and reflected back to a receive LIDAR pixel.

Sensors 533A-533I may include various sensors suitable for collecting data from an autonomous vehicle's surrounding environment for use in controlling the operation of the autonomous vehicle. For example, sensors 533A-533I can include RADAR unit 534, LIDAR unit 536, 3D positioning sensor(s) 538, e.g., a satellite navigation system such as GPS, GLONASS, BeiDou, Galileo, or Compass. The thermal-optical phase shifter designs of FIGS. 1A-4B may be included in interferometers, modulators, and/or resonators in LIDAR unit 536. LIDAR unit 536 may include a plurality of LIDAR sensors that are distributed around autonomous vehicle 500, for example. In some implementations, 3D positioning sensor(s) 538 can determine the location of the vehicle on the Earth using satellite signals. Sensors 533A-533I can optionally include one or more ultrasonic sensors, one or more cameras 540, and/or an Inertial Measurement Unit (IMU) 542. In some implementations, camera 540 can be a monographic or stereographic camera and can record still and/or video images. Camera 540 may include a Complementary Metal-Oxide-Semiconductor (CMOS) image sensor configured to capture images of one or more objects in an external environment of autonomous vehicle 500. IMU 542 can include multiple gyroscopes and accelerometers capable of detecting linear and rotational motion of autonomous vehicle 500 in three directions. One or more encoders (not illustrated) such as wheel encoders may be used to monitor the rotation of one or more wheels of autonomous vehicle 500.

The outputs of sensors 533A-533I may be provided to control subsystems 550, including, localization subsystem 552, trajectory subsystem 556, perception subsystem 554, and control system interface 558. Localization subsystem 552 is configured to determine the location and orientation (also sometimes referred to as the "pose") of autonomous vehicle 500 within its surrounding environment, and generally within a particular geographic area. The location of an autonomous vehicle can be compared with the location of an additional vehicle in the same environment as part of generating labeled autonomous vehicle data. Perception subsystem 554 may be configured to detect, track, classify, and/or determine objects within the environment surrounding autonomous vehicle 500. Trajectory subsystem 556 is configured to generate a trajectory for autonomous vehicle 500 over a particular timeframe given a desired destination as well as the static and moving objects within the environment. A machine learning model in accordance with several implementations can be utilized in generating a vehicle trajectory. Control system interface 558 is configured to communicate with control system 510 in order to implement the trajectory of the autonomous vehicle 500. In some implementations, a machine learning model can be utilized to control an autonomous vehicle to implement the planned trajectory.

It will be appreciated that the collection of components illustrated in FIG. 5C for vehicle control system 520 is merely exemplary in nature. Individual sensors may be omitted in some implementations. In some implementations, different types of sensors illustrated in FIG. 5C may be used for redundancy and/or for covering different regions in an environment surrounding an autonomous vehicle. In some implementations, different types and/or combinations of control subsystems may be used. Further, while subsystems 552-558 are illustrated as being separate from processing logic 522 and memory 524, it will be appreciated that in some implementations, some or all of the functionality of subsystems 552-558 may be implemented with program code such as instructions 526 resident in memory 524 and executed by processing logic 522, and that these subsystems 552-558 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 520 may be networked in various manners.

In some implementations, different architectures, including various combinations of software, hardware, circuit logic, sensors, and networks may be used to implement the various components illustrated in FIG. 5C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), or read-only memories. In addition, each memory may be considered to include memory storage physically located elsewhere in autonomous vehicle 500, e.g., any cache memory in a processor, as well as any storage capacity used as a virtual memory, e.g., as stored on a mass storage device or another computer controller. Processing logic 522 illustrated in FIG. 5C, or entirely separate processing logic, may be used to implement additional functionality in autonomous vehicle 500 outside of the purposes of autonomous control, e.g., to control entertainment systems, to operate doors, lights, or convenience features.

In addition, for additional storage, autonomous vehicle 500 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 500 may include a user interface 564 to enable autonomous vehicle 500 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 500 may include one or more network interfaces, e.g., network interface 562, suitable for communicating with one or more networks 570 (e.g., a Local Area Network ("LAN"), a wide area network ("WAN"), a wireless network, and/or the Internet, among others) to permit the communication of information with other computers and electronic devices, including, for example, a central service, such as a cloud service, from which autonomous vehicle 500 receives environmental and other data for use in autonomous control thereof. In some implementations, data collected by one or more sensors 533A-533I can be uploaded to computing system 572 through network 570 for additional processing. In such implementations, a time stamp can be associated with each instance of vehicle data prior to uploading.

Processing logic 522 illustrated in FIG. 5C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 500 through network 570, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 5C is not intended to limit implementations disclosed herein. Indeed, those skilled in the art will recognize that other alternative hardware and/or software environments may be used without departing from the scope of implementations disclosed herein.

In implementations of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some implementations, memories (not illustrated) are integrated into the processing logic to store instructions to execute operations and/or store data. Processing logic may also include analog or digital circuitry to perform the operations in accordance with implementations of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. A thermal-optical phase shifter comprising:
   a beam formed in a cladding layer and suspended over a cavity;
   a waveguide at least partially disposed in the beam;
   a heating element at least partially disposed in the beam;
   a thermally conductive strip disposed on the beam, wherein the thermally conductive strip is arranged to disperse heat from the beam;
   a plurality of lateral arms configured to suspend the beam over the cavity, wherein each of the plurality of lateral arms is coupled between the beam and a remaining portion of the cladding layer; and
   a plurality of thermally conductive pads disposed on the remaining portion of the cladding layer and coupled to the thermally conductive strip.

2. The thermal-optical phase shifter of claim 1, wherein at least two of the plurality of lateral arms on a first side of the beam are isolated by first openings in the cladding layer, wherein at least two of the plurality of lateral arms on a second side of the beam are isolated by second openings in the cladding layer, wherein each of the plurality of lateral arms is formed in the cladding layer.

3. The thermal-optical phase shifter of claim 1 further comprising:
   a plurality of thermally conductive fingers respectively coupled between the thermally conductive strip and the plurality of thermally conductive pads, wherein at least one of the plurality of thermally conductive fingers extends in a particular direction from the thermally conductive strip over a corresponding one of the plurality of lateral arms.

4. The thermal-optical phase shifter of claim 3 further comprising:
   a substrate layer, wherein the cladding layer is at least partially disposed on the substrate layer; and
   a plurality of thermally conductive vias disposed in the cladding layer and configured to thermally couple the substrate layer to at least one of the plurality of thermally conductive pads.

5. The thermal-optical phase shifter of claim 1, wherein the thermally conductive strip includes metal.

6. The thermal-optical phase shifter of claim 1 further comprising:
   a substrate layer, wherein the cladding layer is at least partially disposed on the substrate layer, wherein the cavity is formed in the substrate layer and is arranged to thermally isolate the beam from the substrate layer with air.

7. The thermal-optical phase shifter of claim 1, wherein the heating element is disposed between the waveguide and the thermally conductive strip, wherein the waveguide is disposed in a particular direction with reference to the beam.

8. The thermal-optical phase shifter of claim 7, wherein the heating element is disposed in the cladding layer and is positioned in the particular direction with reference to the beam and is arranged to impart heat to the waveguide.

9. The thermal-optical phase shifter of claim 1, wherein the waveguide includes silicon or silicon nitride, wherein the cladding layer is formed from silicon dioxide, wherein the heating element is a resistive heating element and is formed from titanium nitride.

10. The thermal-optical phase shifter of claim 1, wherein a portion of the cladding layer is disposed between the waveguide and the heating element.

11. The thermal-optical phase shifter of claim 1 further comprising a substrate layer that is a silicon substrate.

12. A light detection and ranging (LIDAR) device comprising:
- a thermal-optical phase shifter comprising:
  - a beam formed in a cladding layer and suspended over a cavity;
  - a waveguide at least partially disposed in the beam;
  - a heating element at least partially disposed in the beam;
  - a thermally conductive structure disposed on the beam, wherein the thermally conductive structure is arranged to disperse heat from the beam; and
  - a plurality of thermally conductive pads coupled to the thermally conductive structure, wherein the plurality of thermally conductive pads is disposed on a non-beam portion of the cladding layer; and
- a heat sink coupled to the thermal-optical phase shifter and configured to disperse heat from the thermally conductive structure.

13. The LIDAR device of claim 12, wherein the thermal-optical phase shifter further includes:
- a silicon substrate layer, wherein the cavity is formed in the silicon substrate to thermally isolate the beam from the silicon substrate layer.

14. The LIDAR device of claim 12, wherein the thermally conductive structure includes a thermally conductive strip disposed in a particular direction on the beam, wherein the heat sink is coupled to at least one of the plurality of thermally conductive pads.

15. The LIDAR device of claim 12, wherein the heat sink includes at least one of solder balls, silver paste, a ceramic heat spreader, or an active cooler.

16. The LIDAR device of claim 12, wherein the thermally conductive structure includes metal.

17. The LIDAR device of claim 12, wherein the thermal-optical phase shifter further includes:
- a plurality of lateral arms configured to suspend the beam over the cavity, wherein each of the plurality of lateral arms is coupled between the beam and the non-beam portion of the cladding layer.

18. An autonomous vehicle comprising:
- a light detection and ranging (LIDAR) sensor including:
  - a thermal-optical phase shifter comprising:
    - a beam formed in a cladding layer and suspended over a cavity;
    - a waveguide at least partially disposed in the beam;
    - a heating element at least partially disposed in the beam;
    - a thermally conductive strip disposed on the beam, wherein the thermally conductive strip is arranged to disperse heat from the beam; and
    - a plurality of lateral arms configured to suspend the beam over the cavity, wherein each of the plurality of lateral arms is coupled between the beam and a remaining portion of the cladding layer; and
    - a plurality of thermally conductive pads disposed on the remaining portion of the cladding layer and coupled to the thermally conductive strip; and
  - a heat sink coupled to the thermal-optical phase shifter and configured to disperse heat from the thermally conductive strip; and
- a control system configured to control the autonomous vehicle in response to a returning beam that is a reflection of a LIDAR transmit beam.

19. The autonomous vehicle of claim 18 further comprising a heat module configured to modulate a phase of the LIDAR transmit beam propagating through the waveguide by modulating electrical current driven through the heating element.

* * * * *